United States Patent [19]

Yucius et al.

[11] 4,284,977
[45] Aug. 18, 1981

[54] DATA ACQUISITION TECHNIQUE FOR HOIST AND CONVEYING SYSTEMS

[75] Inventors: Albert C. Yucius, Brockton; Michael D. Brother, Abington, both of Mass.

[73] Assignee: Systems Engineering & Mfg. Corp., Stoughton, Mass.

[21] Appl. No.: 63,069

[22] Filed: Aug. 2, 1979

[51] Int. Cl.³ .............................................. H04Q 3/00
[52] U.S. Cl. ............................. 340/147 P; 340/149 R
[58] Field of Search ................. 340/147 P, 23, 149 R; 414/134, 136, 152; 235/92 MP, 92 PD

[56] References Cited

U.S. PATENT DOCUMENTS

| | | | |
|---|---|---|---|
| 3,002,115 | 9/1961 | Johnson | 340/147 P |
| 3,184,725 | 5/1965 | Siegel | 340/147 P |
| 3,274,553 | 9/1966 | Oya | 340/147 P |
| 3,278,817 | 10/1966 | Johnson | 340/147 P |
| 3,815,084 | 6/1974 | Pease | 340/23 |
| 3,996,568 | 12/1976 | Sturm | 340/147 P UX |

*Primary Examiner*—Harold I. Pitts
*Attorney, Agent, or Firm*—Wolf, Greenfield & Sacks

[57] ABSTRACT

A data acquisition system is used in an industrial environment in connection with the conveying of work pieces or the like usually through a number of processed steps such as in connection with a programmable conveying system which may be used in the field of electroplating, heat treating or an immersion coating. With the technique of this invention positive data feedback from the product member (work piece) is obtainable for the purpose of, for example, identity of work parts, choice selection, or critical parameter control. The technique utilizes two separate channels including a sync channel and a data channel for providing target information which is read serially as the work is hoisted by a two-channel photo electric receiver/transmitter preferably mounted to a stationary member of the hoist frame or leg. The data and synchronizing channel signals are used combinatorily to provide a system that is immune to the rate differential of carriers or stop-restart operation. In a preferred mode of operation at the time that the piece being conveyed is loaded at a load station, the operator introduces a coded card or the like carried by the hoist, which card may be subsequently read by the reader with the data on the card representative of certain information such as the identity of the parts.

16 Claims, 5 Drawing Figures

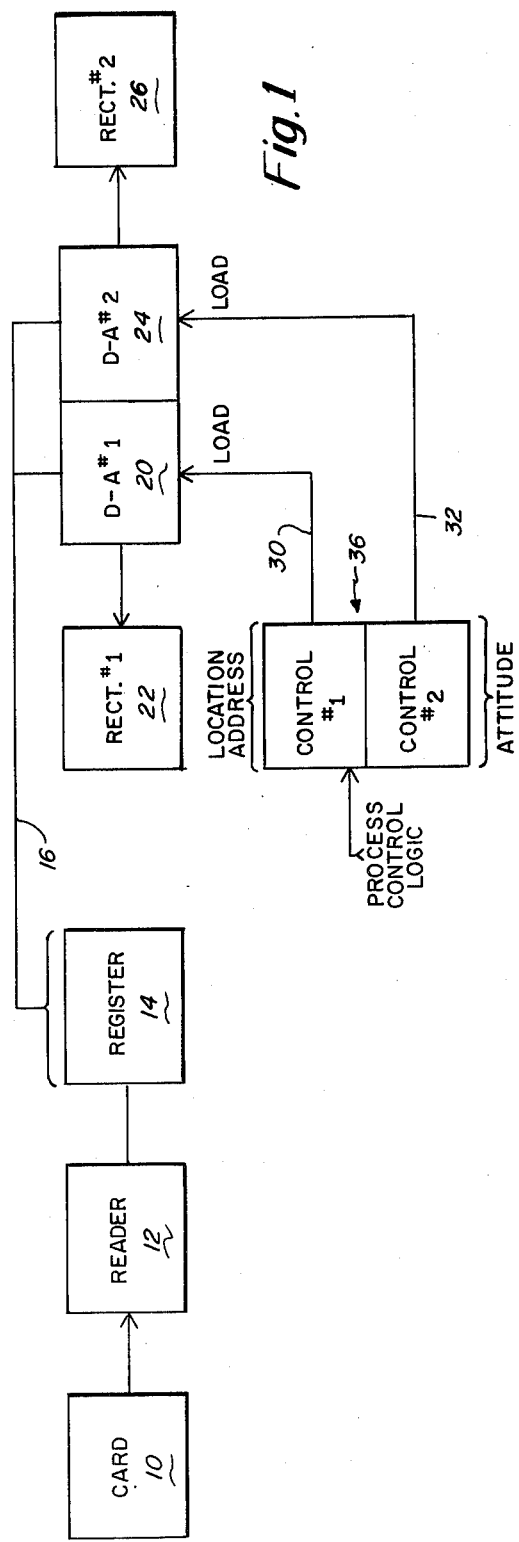
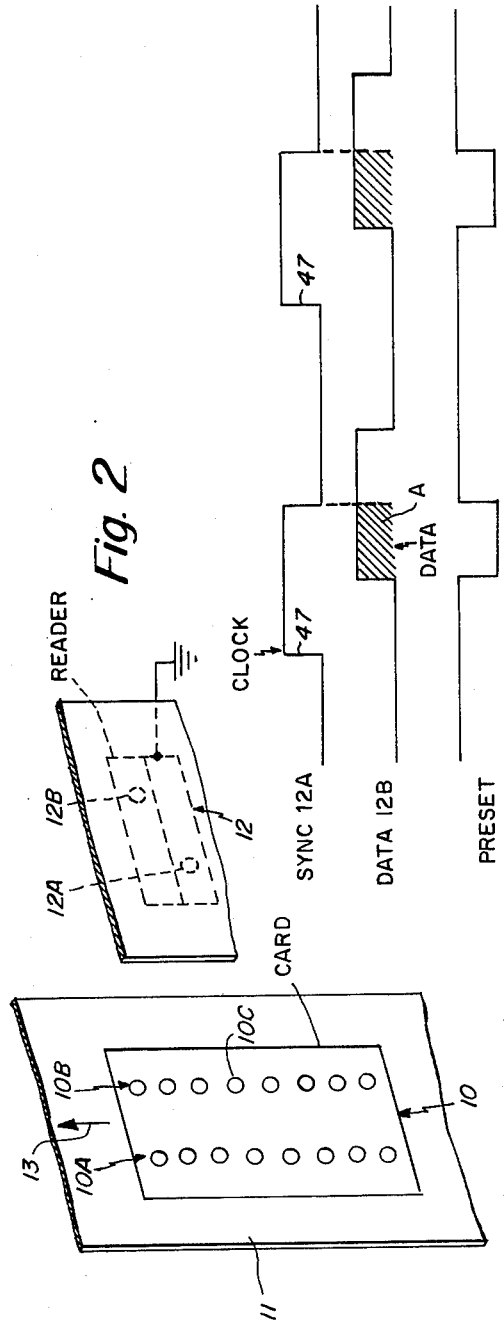

DATA ACQUISITION TECHNIQUE FOR HOIST AND CONVEYING SYSTEMS

BACKGROUND OF THE INVENTION

The present invention relates in general to a data acquisition technique which is used in association with a conveying system or a hoist system such as one employing a hoist crane. The technique of this invention may be used in association with a programmable conveying or hoisting system. In accordance with the invention there is provided data associated with the product member (work piece) which is being transported in a process such as an electroplating process. The data that is read may be in many different forms in accordance with the invention for different usages. For example, the data may represent a carrier number which would identify the particular parts being processed. Secondly, the data could be representative of decision data to select the particular process station at which a choice in operation may exist. The data may then be read to make this selection. Finally, the data that is read in accordance with this technique may be representative of a critical processing parameter to be used as a form of control at a particular station upon delivery of the product member or pieces to that particular station.

Accordingly, the concepts of this invention have a wide application of usage for the particular data that is read. However, there are a number of restrictions associated with prior art systems which must be overcome. Some of these restrictions or drawbacks are hostile environments, broad positioning tolerances, load sway, physical clearances, and variations of equipment speed in particular with relationship to the interruption and resumption of processing.

One type of prior art arrangement is a parallel-type coded reader which has been used on hoist cranes and which is usually activated at the top of the hoist when the product member is in its transverse attitude. One of the disadvantages of this prior art arrangement is the requirement for a plurality of sensors or switches at a rate of one sensor or switch per bit of data. There is also a space constraint with regard to the mounting of all of these sensors or switches. Furthermore, there is a positioning tolerance with regard to the stopping of the target reliably after each hoist operation. With such systems there is usually a requirement of a settling delay time before reading occurs to insure stable alignment at the time that the data is injected into the controller.

Another prior art arrangement employs parallel sensors that require that signals be transmitted into these sensors. Such sensors also possess the disadvantage of the requirement of a plurality of sensors at a rate of one sensor per bit of information. Additionally, these arrangements have the disadvantage of requiring one group of sensors for each process station or process tank where this data is utilized. In addition to being inflexible relative to placement of the sensors, there is a practical problem which is at least partially environmental of having these sensors at the process tanks. This is an unreliable and hostile environment.

In accordance with another prior art technique product data has been transferred through a plurality of process stations by way of shift register loading. This technique normally includes the inputting of data when the parts are injected into the system, a shifting update as the machine progresses and a reading of data at various points as required by the process stations. Such a technique assumes that the product members are loaded in the same order as they are injected into the system which may not be the situation especially with the requirement of multi-process cycling on the same equipment or where there is frequent interaction with the process sequence as in clearing a fault or semi-reworking unacceptable products before allowing resumption. This technique whether implemented in hardware or in software possesses the same inflexible disadvantages listed previously. With this shift register technique the register must be constructed to the exact data field that is being considered and be shifted each time an index occurs. This thus requires that there be an absolute order of parts relative to the data reading per the process cycle. This design is further complicated when a second process is run on the same system wherein a different relationship between part injection and number of indexes before product data is required exists.

Accordingly, one object of the present invention is to provide an improved data acquisition system and, in particular, one that is usable in association with a conveying system or a hoist system employing a hoist crane.

Another object of the present invention is to provide a data acquisition system that is quite widely usable with a number of different types of control. For example, this system may be used in association with a system shown in U.S. Pat. No. 3,803,561 which discloses a programmable hoist system. The data acquisition system of this invention may be used to identify the parts at a specific station, to make a process variable decision, or to input critical process control information at a specific process station.

A further object of the present invention is to provide an improved data acquisition system as described herein which operates accurately and is not affected by an interruption, or operation of a program not previously intended. In this regard the form of data acquisition of this invention permits a stop and start sequence to occur without loss of data.

Still another object of the present invention is to provide an improved data acquisition system as described herein and which is not affected by such parameters as load sway or variations of equipment speed.

Still another object of the present invention is to provide an improved data acquisition system that is relatively simple in construction having a relatively minimum number of sensors required by employing a serial-type of data sensing system.

Still another object of the present invention is to provide an improve data acquisition system for use with a conveying or hoisting system and which is not materially affected by any hostile environmental conditions or any broad positioning range tolerances.

SUMMARY OF THE INVENTION

To accomplish the foregoing and other objects of this invention there is provided a data acquisition technique and associated method wherein data associated with a hoist can be read at the different stations of the system. This data may identify the parts reaching a specific station, or the data can be used to make a process variable decision. Also, such data can be read for purposes of critical process control at a specific process station. Although the data acquisition system of this invention can be used for a variety of purposes as outlined herein, there is described herein one disclosed system wherein the data is used for the control of rectifiers associated with tanks in a conveying system which may be a programmable conveying system such as one used in conjunction with an electroplating process that is to be automatically conducted. The conveying system typically comprises a wagon which includes a stationary member and a hoist with the wagon progressing from station to station possibly under some type of programmable automatic control. For example, reference is made herein to issued U.S. Pat. No. 3,803,561 which shows a programmable conveying system which is of a station searching type. Of the different stations traversed by the wagon, the controls that may be used are provided at certain ones of these stations such as at a tank having associated therewith a rectifier for controlling a phase of an electroplating process. The data acquisition system of this invention may also be used for the purpose of identifying a specific part by carrier number to thus identify a certain batch of work or pieces.

There is provided herein a system and associated method of data acquisition for use in association with a hoist crane or other type of conveying system which may typically include a wagon comprised of a stationary member and a movable member, the wagon progressing from station-to-station possibly under some programmed automatic control. There is provided a coded indicia means with the code representing some type of control parameter. This coded indicia means is preferably in the form of a coded card and is removably received by means on the hoist for receiving the card and including means for reading and storing the data on the card. This means preferably includes a two-channel reader which may be an optical reader with the coded card having a data channel and a sync channel. These channels are skewed one to the other with the sync channel bits being read before the data channel bits, and requiring a combination of both to define each bit of data.

In accordance with one use of the data acquisition system of this invention, at a loading station, the operator of this system inserts a card or the like means having indicia thereon representative of the data code which is read by the reader and stored in a register. In accordance with the specific type of control disclosed herein wherein there is a critical process control of a parameter such as a recitifier setting, the code is transferred to a digital-to-analogic converter but the code is only latched or loaded into the converter upon a selective enabling from control logic as a function of, for example, wagon position. In this disclosed embodiment the code that is read is a binary code preferably in binary coded decimal corresponding to an analog output voltage by which the rectifiers are to be controlled. This overall control scheme is covered in a copending application Ser. No. 63,070.

DESCRIPTION OF THE DRAWINGS

Numerous other objects, features and advantages of the invention should now become apparent upon a reading of the following detailed description taken in conjunction with the accompanying drawings, in which:

FIG. 1 is a block diagram of a system incorporating the data acquisition technique of this invention;

FIG. 2 schematically depicts the physical arrangement of the reader and card of FIG. 1;

DETAILED DESCRIPTION

The data acquisition technique of this invention is for use in particular in association with a hoist crane or other type of conveying system and thus is used in an industrial environment such as for the purpose of conveying a work piece through a plurality of process tanks such as might occur in the field of electroplating, heat treating or immersion coating. In accordance with one version of the invention this data may be read each time the wagon is at a particular station to determine, for example, the identity of the parts and whether any action is to be taken at that station. Herein there is described one total system in which the data acquisition system of the invention can be incorporated. In the system described herein the data is in the form of a critical process parameter to be used at a station upon delivery of the product. More specifically, the system described herein is for the control of rectifiers associated with an electroplating process. Other uses of the data include the use of identifying the wagon's arrival at a particular station, or determination of arrival at a station for the purpose of making a subsequent choice at that station.

Figure 3:
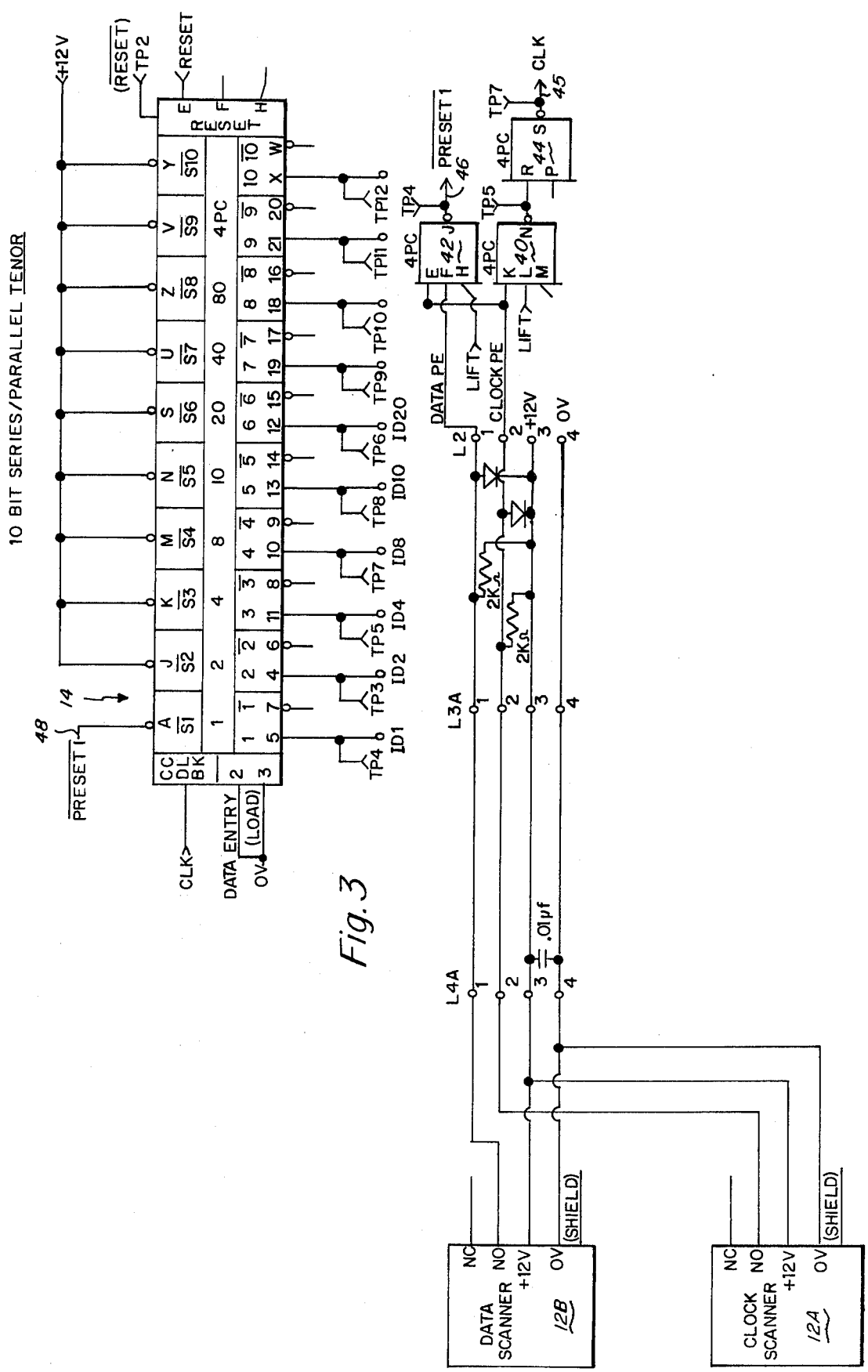
FIG. 3 shows further detail from a logic standpoint of the reader and register of FIG. 1.
Figure 4A:
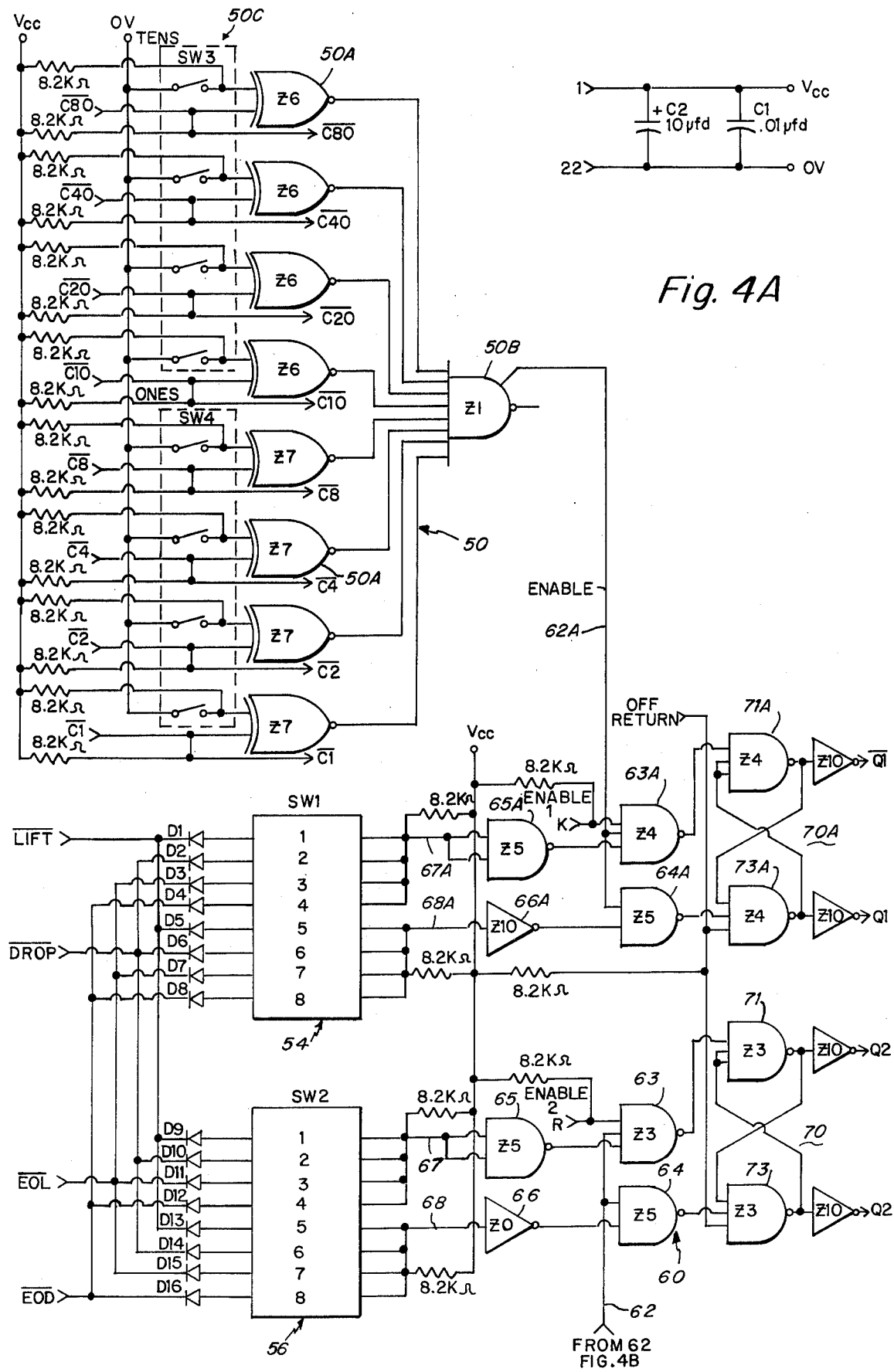
FIGS. 4A and 4B show the process control logic also depicted in FIG. 1 for two station control.
Figure 4B:
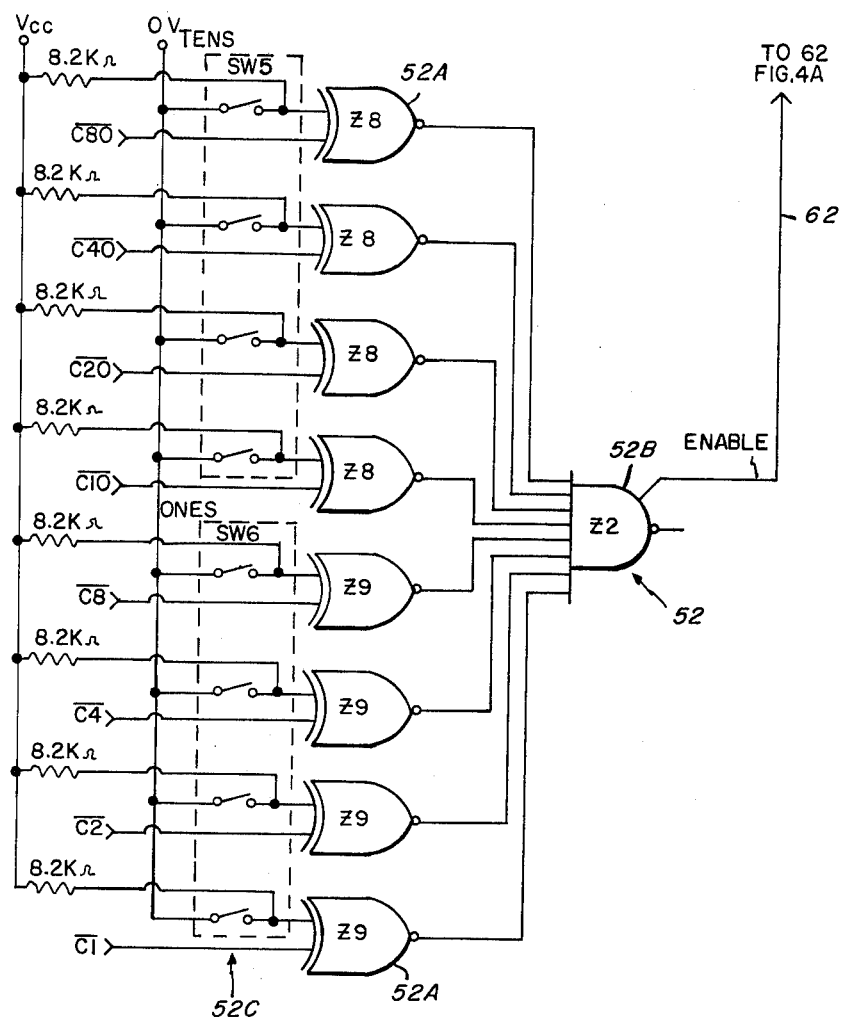

FIG. 1 shows in a general sense the components of a total control system, with the total system being the subject matter of a copending application Ser. No. 63,070. FIGS. 2–4 show further details of some of the blocks depicted in FIG. 1. Although the total control system is depicted herein, the concepts of the invention relate to the data acquisition portion thereof comprising primarily the input section of the block diagram of FIG. 1 including the card 10 and the reader 12. The control system of FIG. 1 may be used in conjunction with a conveying system such as the programmable system shown in U.S. Pat. No. 3,803,561. Such a system is of the station searching type including counter means described in the patent for continuously tracking the location of the wagon, which location is represented by an address code. This code is also used in connection with the present description and, in particular, the description of FIGS. 4A and 4B described in detail hereinafter.

In a conveying system there is usually one location which may be referred to as a loading location or loading station where the pieces being conveyed are loaded onto the hoist. At that position, the card 10 depicted in block form in FIG. 1 is loaded by the operator onto the work bar at the load station. The reader 12 depicted in FIG. 1, comprises a phototransistor-photocell arrangement for reading the card 10 and logic means described in FIG. 3 for directing the code on card 10 into the register 14. The register 14 is also described in FIG. 3 and is preferably a shift register having a serial/parallel input, a preset input and a parallel output. The line 16 in FIG. 1 represents the parallel output from the register 14 which couples to the converters 20 and 24. Because FIG. 1 is a schematic general block diagram, single lines are depicted although the line 16 in FIG. 1 is actually a series of conductive lines which are preferably eight separate data lines coupling from the shift register 14 to both digital-to-analog converters 20 and 24. The output of these converters couple, respectively, to rectifiers 22 and 26. Rectifiers are known devices as are the digital-to-analog converters 20 and 24. Each of these converters may be of the type sold by Datel Systems Inc. of Canton, Mass., identified as their DAC-HK Series converter. Each of the rectifiers 22 and 26 receives a control analog voltage which establishes the amp-hours of power applied at the tank associated with the particular rectifier for controlling such a process as an electroplating process to control the thickness of the plating. With the use of the converter this control voltage can be controlled precisely to in turn control the thickness of plating precisely, assuming that the immersion time is a constant. It is noted in FIG. 1 that the parallel lines represented by the line 16 connect in common to both converters referred to herein as converters #1 and #2. Data may be presented to the converters 20 and 24 upon each lift sequence but the converters are only enabled upon the proper selective signals to the load inputs thereof by way of lines 30 and 32 from the control #1 and control #2 sections of the process control logic 36. The process control logic 36 of FIG. 1 is responsive to a location address representative of the position of the wagon and also to attitude controls discussed hereinafter. The two control sections of the logic 36 are each individually presettable to identify a particular station at which the control is to occur. Further description of the control logic 36 is in connection with the description of FIGS. 4A and 4B.

FIG. 2 shows the card 10 which may be removably received by the hoist 11. The card 10 may be received in an aligning pocket on the flight bar of the hoist. When the operator is loading the hoist of the conveying system, the coded card 10 is inserted into the pocket with the code thereon indicating the desired rectifier setting at the target tank. The card 10 may be of plastic or cardboard and contains basically two channels 10A and 10B. The channel 10A preferably comprises eight bits and is referred to as the sync channel. The channel 10B also contains one bit of data for each sync bit and is referred to as the data channel. The data is represented by the presence or absence of reflective discs in the areas 10C. The cards can each be previously identified with the operator being provided an instruction list identifying each card and which is to be used for each piece being processed.

In an alternative arrangement the card 10 may have all reflective areas and it may be fixed in position. In association with the card there is provided a mask which can cover certain of the reflective areas to thus code the card in accordance with the pattern on the mask. Also, with the use of a mask, this technique would lend itself to a key operator system where the masks or templates are produced by an operator on demand. In this way it is not necessary to have separate reflector cards for each setting but instead one can employ cards having all reflectors and use them in association with masks for producing the desired data patterns.

In FIG. 2 the reader 12 is on a stationary frame of the hoist so that during a lift operation there is relative movement between the card 10 and the reader 12. The reader 12 is provided with optical detectors or scanners 12A and 12B which are arranged in a staggered or skewed arrangement as depicted in FIG. 2. FIG. 2 also shows by way of arrow 13 the direction of movement of card 10 relative to the reader. In this connection the optical detector 12A reads channel 10A while the optical detector 12B reads the channel 10B. It is preferred that all of the areas 10C of channel 10A are reflective so that there are eight sync pulses generated by way of the optical detector 12A. These sync pulses are effectively clock pulses that clock the data forwardly in the register 14. With the use of equal spacing for the reflectors the clock pulses are symmetrical. Actually, the equal spacing of the sync pulses is not totally essential but it is important that there be alignment between the sync and associated data channels.

The arrangement of the reader 12 and the card 10 means that a sync signal is received at the optical detector 12A prior to any data being received at the detector 12B. Each of the detectors 12A and 12B may comprise a light source and associated phototransistor or photocell. FIG. 2 also shows waveforms associated with the detectors or scanners 12A or 12B. It can be seen that there is an overlap in the area A. In this connection, reference is now made to FIG. 3 which shows the clock scanner 12A and the data scanner 12B providing the respective clock and data outputs. These outputs couple to the NAND gates 40 and 42. The gate 40 receives the clock input and a LIFT signal. The gate 42 receives the LIFT signal, the clock signal and also the data signal. The output of gate 40 is coupled by way of inverter 41 to provide a clock signal on line 45 which couples to the clock input of the shift register 14. The output from gate 42 on line 46 couples to the preset input 48 of the register 14. In FIG. 2 the waveform at the reader 12B represents a binary ONE. If a data pulse is missing, then there is a lack of coincidence between the two channels and this represents a binary ZERO. The third waveform shown in FIG. 2 represents the preset output from gate 42. The gate 42 essentially senses the coincidence of data in both channels representative of reflectors in both channels.

The logic of FIG. 3 operates so that the gates 40 and 42 are only enabled during a lift operation and thus it is only during a lift that data from a card 10 is input to the shift register 14. At the rising clock edge 47 of the clock signal, the output on line 45 is also positive-going and causes a transition at the clock input to the shift register 14. At the time of occurrence of the first clock pulse there is not yet any coincidence sensed by the gate 42 and thus the signal on line 46 from gate 42 to the input 48 of the register is at its high state essentially presetting a ZERO in parallel into the register 14. Thus, at the time of the first clock signal there is in effect no data coupled into the register. In another sense one can consider that the clock pulse enters a ZERO into the register. However, before occurrence of the next clock pulse a signal to the preset input at line 48 is coincidence sensed by the gate 42. If the signal on line 48 is at a ZERO level, this indicates the presetting of a ONE and vice versa. Thus, upon the occurrence of each clock pulse the data on the preset input is entered into the register on a continued basis. There is no final clock pulse after the final preset but this is not necessary because the entered final preset state is stored in the last position without being clocked along the register.

The data acquisition system of this invention depicted in FIGS. 1-3 has a key advantage in that it will operate even though there may be variations in speed with which the card traverses past the reader. Also, this arrangement which relies primarily upon edge triggering for clocking and coincidence or lack of coincidence for data will operate even upon interruption followed by resumption of motion between the card and reader.

After all of the data from the card has entered the register 14, then the register 14 has this parallel data on line 16 coupled to the converters 20 and 24. It is noted that although the register may have a reset input, it is not necessary to provide any resetting for the register. With the parallel input preset technique of this invention, the new data that is read may simply be reintroduced over any old data in the register 14. Also, as previously indicated, because of the edge triggering even if there is an interruption in the motion of the card, this will not destroy the data being entered into the register 14.

FIGS. 4A and 4B show the process control logic 36 of FIG. 1. Again, this is only one form of use of the data acquisition system of this invention in connection with rectifier setting control. This logic is for two station control in association with the two converters 20 and 24 of FIG. 1. The logic 36 includes comparators 50 and 52, switches 54 and 56, and output logic gating 60. Each of the comparators 50 and 52 are of substantially the same construction. For example, comparator 50 includes eight gates 50A and an output gate 50B and a switch array 50C. Similarly, the comparator 52 includes gates 52A, output gate 52B and the switch array 52C. Each of the switch arrays comprise eight separate switches, each of which individually connects to one input of one of the gates 50A, 52A. The gates 50A and 52A are exclusive NOR gates such as type CD4077BE. The output gates 50B and 52B are used as AND gates. Each of the switch arrays 50C, 52C is separated into two groups each comprising four individual switches. One set of four switches represents a "ones" digit while the other four switches represents a "tens" digit. The four switches are used to represent a decimal number in BCD. All eight switches in a group connect to one input of each of the gates 50A, 52A. Thus, the selective positions of each of the individual switches is meant to represent a particular station including stations zero through ninety-nine. Thus, the comparator 52 could have its eight switches arranged to decode station 26, whereas the comparator 50 could have its switches arranged to decode different stations such as station 55.

The input to each of the comparator gates 50A, 52A from the switches represents a fixed or reference output. The other output to each of these gates is an address that is continually updated and identifies the position of the wagon at all times in the conveying system. This address signal is represented also by eight bits identified in two groups as signals $\overline{C1}$, $\overline{C2}$, $\overline{C4}$ and $\overline{C8}$; and $\overline{C11}$, $\overline{C12}$, $\overline{C14}$ and $\overline{C18}$. In this connection, reference is made to the U.S. Pat. No. 3,803,561 which shows as part of the overall system a retentive memory showing similar outputs representing an address representative of the position of the wagon. Thus, the gates 50A and 52A shown in FIGS. 4A and 4B are for sensing a comparison between the predetermined address (station) as represented by the switches and the present address as identified by the location counter outputs.

When all of the gates 52A or 50A are satisfied then all of the outputs therefrom are in their high state and there is a high level enabling signal on the output lines from the gates 50B and 52B. Of course, each of the switch arrays 50C and 52C would be typically set to different addresses and thus the enable at the output of the gates 50B and 52B would occur at different wagon locations. Also, because we are discussing a system having a single wagon then the output signals from gates 50B and 52B will not occur at the same wagon station.

If the comparator 52 senses a comparison because the wagon has now arrived at a target station where rectifier control is to take place, then there is an enabling signal on line 62 to the gates 63 and 64. The other inputs to gates 63 and 64 are from inverters 65 and 66, respectively. These inverters in turn couple from the output lines 67 and 68, respectively from switch 56. The output logic also includes gates 63A and 64A, inverter 65A and 66A, and output lines 67A and 68A associated with switch array 54. The output enabling signal on line 62A couples to gates 63A and 64A.

The particular arrangement of the switches 54 and 56 provide attitude control so that the output signals Q1 and $\overline{Q1}$ are only switched at the proper attitude of the hoist. The system shows the signals $\overline{\text{LIFT}}$, $\overline{\text{DROP}}$, $\overline{\text{EOL}}$ and $\overline{\text{EOD}}$. The latter two signals represent an end of lift and end of drop state. All four of these signals couple to the switches or shunts 54 and 56. One can interconnect these switches in different ways; so that one of the four signals controls the output lines 67A, 68A or 67 and 68. Thus, if the control is upon a drop operation then a set signal is coupled, for example, on line 67 to gate 65 and the output of gate 63 provides a low level signal for setting the flip-flop 70 which comprises gates 71 and 73. The setting of this flip-flop 70 provides a high level signal on the output terminal Q2 and a low level signal on the negation output $\overline{Q2}$. Similarly, there is also a flip-flop 70A comprised of gates 71A and 73A which can be activated by an enabling signal on line 62A rather than an enabling signal on line 62. After the drop signal has terminated then there can be a reset signal on line 68, for example, that causes by way of gates 64 and 66, a resetting of the flip-flop 70 at gate 73. This action resets the flip-flop and essentially terminates the Q2 output signal.

Previously in FIG. 1 there was shown lines 30 and 32 coupling from the process control logic. The line 30 may intercouple from the Q1 input of FIG. 4 to the first digital-to-analog converter. Similarly, the output line 32 may couple from the Q2 output in FIG. 4 to the second digital-to-analog converter.

Once the operator loaded the wagon and has inserted the card 10 then the wagon progresses from station to station until one of the target stations is reached. This condition is sensed by one of the comparators of FIG. 4 and when the hoist is at the proper preset attitude an enabling signal is generated such as a signal on line 30 to the first digital-to-analog converter associated with this first station at which control is to take place. As indicated in FIG. 1 the signal on line 30 is a load signal or an enabling signal to the converter 20 permitting the generation of an output analog signal to the rectifier 22, the magnitude of which is a function of the input digital signal on multiwire line 16 from the register 14.

Although the principles of the invention are described in connection with rectifier control, it is understood that the principles of the invention may also be used in association with other types of control. For example, one may want to identify the arrival at a particular station with the coded card being used to control alternative decisions that can be made at the station, or possibly where to move from that station. In another version one may want to detect where to store a fixture that has just been lifted, such as in a storage and retrieval system.

What is claimed is:

1. In a conveying system having a hoist moveable between a plurality of stations, a data acquisition system associated with the conveying system comprising;

coded indicia means with the code representing a control parameter, means associated with a moveable part of the hoist for receiving the coded indicia means, reading means for reading the coded indicia, means associated with another part of the hoist for receiving the reading means permitting relative movement at a station between the coded indicia means and reading means, and means responsive to the coded reading for interpreting the control parameter, said coded indicia means including a sync channel and a data channel, said reading means including a sync channel reader and a data channel reader and means combining the sync and data channel bits to determine code content.

2. In a conveying system as set forth in claim 1 wherein said sync channel reader is arranged to read the sync channel ahead of the data channel reader reading the data channel.

3. In a conveying system as set forth in claim 2 wherein the sync channel includes a plurality of sync bits and the data channel includes a plurality of data bits with the sync and data bits in alignment but with the sync and data readers skewed to provide first a sync bit reading followed by a data bit reading.

4. In a conveying system as set forth in claim 1 wherein said means combining the sync and data channel bits includes first gate means providing a clock signal and second gate means receiving both sync and data channel bits to provide a data signal.

5. In a conveying system as set forth in claim 4 including data storage means responsive to said clock and data signals for storing the code on said coded indicia means.

6. In a conveying system as set forth in claim 1 wherein the coded indicia means includes a coded card removably received by the hoist, said card having reflective meand defining separate sync and data channels, said reading means including a sync channel optical reader and a data channel optical reader.

7. In a conveying system as set forth in claim 2 wherein, although the sync channel is read before the data channel, both channels are read concurrently for a short overlap period which determines data content.

8. For a conveying system having a hoist apparatus moveable between a plurality of stations, a data reading system comprising;

coded indicia means with the code representing a control parameter;

reading means for reading the code, means for supporting the coded indicia means and means for supporting the reading means both from the hoist apparatus but permitting relative movement at each station between the coded indicia means and the reading means, and means coupled from said reading means for storing said code for control, said coded indicia means having at least two channels including a synchronizing channel and a data channel, said reading means having a sync channel reader and a data channel reader and means combining said sync and data channel bits to determine the code to be stored.

9. For a conveying system as set forth in claim 8 wherein said readers and code indicia means channels are arranged to read a synchronizing channel bit a predetermined period of time before reading a data channel bit.

10. For a conveying system as set forth in claim 9 wherein the sync channel includes a plurality of sync bits and the data channel includes a plurality of data bits with the sync and data bits in alignment but with the sync and data readers skewed to provide first a sync bit reading followed by a data bit reading.

11. For a conveying system as set forth in claim 8 wherein said means combining the sync and data channel bits includes first gate means providing a clock signal and second gate means receiving both sync and data channel bits to provide a data signal.

12. For a conveying system as set forth in claim 11 including data storage means responsive to said clock and data signals for storing the code on said coded indicia means.

13. For a conveying system as set forth in claim 8 wherein the coded indicia means includes a coded card removably received by the hoist, said card having reflective means defining separate sync and data channels, said reading means including a sync channel optical reader and a data channel optical reader.

14. For a conveying system as set forth in claim 9 wherein, although the sync channel is read before the data channel, both channels are read concurrently for a short overlap period which determines data content.

15. For a conveying system as set forth in claim 8 wherein said stations include a load station and a target station, said code indicia means being presented to said hoist apparatus at said load station.

16. For a conveying system as set forth in claim 8 wherein said storage means includes a register receiving preset data which is a function of both channels and clock data from the sync channel, said register adapted to clock preset data therealong.

* * * * *